United States Patent
Buescher et al.

(10) Patent No.: US 11,764,014 B2
(45) Date of Patent: Sep. 19, 2023

(54) MULTI-VOLTAGE CONTACTORS AND CONTROLS AND RELATED METHODS

(71) Applicant: EMERSON ELECTRIC CO., St. Louis, MO (US)

(72) Inventors: Thomas P. Buescher, Webster Groves, MO (US); Greg Sisk, Bonne Terre, MO (US); Vince Fargo, St. Charles, MO (US); Randy T. Ruiz, St. Peters, MO (US); Bradley C. Zikes, Sunset Hills, MO (US)

(73) Assignee: Copeland Comfort Control LP, St. Louis, MO (US)

( * ) Notice: Subject to any disclaimer, the term of this patent is extended or adjusted under 35 U.S.C. 154(b) by 945 days.

(21) Appl. No.: 16/691,095

(22) Filed: Nov. 21, 2019

(65) Prior Publication Data

US 2020/0194205 A1 Jun. 18, 2020

Related U.S. Application Data

(60) Provisional application No. 62/781,461, filed on Dec. 18, 2018.

(51) Int. Cl.
| | |
|---|---|
| *H02J 3/12* | (2006.01) |
| *H01H 50/00* | (2006.01) |
| *H02P 25/02* | (2016.01) |
| *H01H 47/22* | (2006.01) |
| *H01H 50/44* | (2006.01) |
| *H01H 50/02* | (2006.01) |
| *G05B 15/02* | (2006.01) |
| *H01H 47/00* | (2006.01) |

(52) U.S. Cl.
CPC .......... *H01H 47/223* (2013.01); *G05B 15/02* (2013.01); *H01H 47/002* (2013.01); *H01H 50/02* (2013.01); *H01H 50/443* (2013.01); *H01H 2300/052* (2013.01)

(58) Field of Classification Search
CPC .... H01H 47/223; H01H 47/002; H01H 50/02; H01H 50/443; H01H 2300/052; G05B 15/02
See application file for complete search history.

(56) References Cited

U.S. PATENT DOCUMENTS

| | | | | |
|---|---|---|---|---|
| 1,046,167 | A * | 12/1912 | Floyd | F04B 7/04 92/159 |
| 1,087,927 | A * | 2/1914 | Deuther | A63D 9/00 473/123 |
| 4,748,343 | A | 5/1988 | Engel | |
| 5,796,183 | A * | 8/1998 | Hourmand | H03K 17/962 307/139 |
| 5,856,905 | A * | 1/1999 | Eckel | H01H 47/007 361/187 |

(Continued)

OTHER PUBLICATIONS

16E09-101 Universal Electronic Temperature Control Installation and Operation Instructions; web accessed Dec. 14, 2018; 8 pgs.

(Continued)

*Primary Examiner* — Brandon S Cole
(74) *Attorney, Agent, or Firm* — Harness, Dickey & Pierce, P.L.C.; Anthony G. Fussner

(57) ABSTRACT

Exemplary embodiments are disclosed that include multi-voltage contactors, controls, and related methods.

9 Claims, 6 Drawing Sheets

(56) References Cited

U.S. PATENT DOCUMENTS

| | | | |
|---|---|---|---|
| 6,014,325 A * | 1/2000 | Pecore | F25D 29/00 |
| | | | 363/125 |
| 6,647,346 B1 | 11/2003 | Zikes | |
| 7,100,382 B2 | 9/2006 | Butler et al. | |
| 7,444,824 B1 | 11/2008 | Butler et al. | |
| 7,464,561 B1 | 12/2008 | Butler et al. | |
| 7,694,525 B2 | 4/2010 | Butler et al. | |
| 9,484,771 B2 * | 11/2016 | Braylovskiy | H02J 9/061 |
| 9,837,816 B2 * | 12/2017 | Miyamura | H02J 1/102 |
| 10,605,495 B1 * | 3/2020 | Falls | F25B 13/00 |
| 10,840,735 B1 * | 11/2020 | Cooper | H02J 13/00004 |
| 2013/0107401 A1 * | 5/2013 | Helt | F24F 11/84 |
| | | | 361/33 |
| 2013/0211615 A1 | 8/2013 | Zikes et al. | |
| 2018/0292102 A1 * | 10/2018 | Mowris | F24D 19/1084 |

OTHER PUBLICATIONS

49P11-843 Emerson SureSwitch™ Installation Instructions; web accessed Dec. 14, 2018; 4 pgs.
SureSwitch™ Multi-Voltage Contactor Upgrade; web accesssed Dec. 14, 2018; 2 pgs.

* cited by examiner

221 ↘

Use complimented EEPROM location with 3 separate values to identify 3 conditions:
At power up, the control will check EEPROM to determine brownout threshold value.
-Voltage level not set (production default value). This will cause the control to determine voltage level per 225
-120VAC voltage level – this condition will set brownout threshold=93VAC
-240VAC voltage level – this condition will set brownout threshold=180VAC  ~223

Determination of voltage range:
If EEPROM locations show voltage level not set, the control will monitor input voltage, if voltage is stable then:
-If voltage is between 90-140 VAC, the EEPROM will be set EEPOM to 120VAC voltage level
-ELSE: the control will set the voltage level to 240VAC voltage level  ~225

Brownout error
If the line voltage remains below the brownout threshold and dipswitch brownout (SW2-2) is set to the on position, the control shall:
-Display the appropriate error code.
-The control shall de-energize relay and not allowed to resume until the voltage returns to a minimum of 190V for 240V level or 100V for 120V level.
If dipswitch brownout (SW2-2) is set to the off position control will not act upon a low VAC line condition.  ~227

Voltage level reset
If dipswitch brownout (SW2-2) changes from the off state to the on state, the control will set the voltage level.  ~229

FIG. 5

MULTI-VOLTAGE CONTACTORS AND CONTROLS AND RELATED METHODS

CROSS-REFERENCE TO RELATED APPLICATION

This application claims the benefit and priority of U.S. Provisional Application No. 62/781,461 filed Dec. 18, 2018, which is incorporated herein by reference in its entirety.

FIELD

The present disclosure relates to multi-voltage contactors, controls, and related methods.

BACKGROUND

This section provides background information related to the present disclosure which is not necessarily prior art.

Climate control systems (e.g., an air conditioning, heat pump systems, refrigeration systems, etc.) typically include components such as compressors that are turned on and off by contactors in response to thermostat signals. Such contactors are relatively expensive, and frequently provide no functionality except to connect and disconnect system components to and from electric power. Also, contactors are common repair items due to the open nature of the electrical contact and the high current inductive loads that are switched, which can burn contacts.

DRAWINGS

The drawings described herein are for illustrative purposes only of selected embodiments and not all possible implementations, and are not intended to limit the scope of the present disclosure.

FIG. 5 is a flow chart illustrating an example Brownout Auto Detect method for determining input voltage and adjusting brownout threshold according to an example embodiment of the present disclosure.

Corresponding reference numerals may indicate corresponding (though not necessarily identical) parts throughout the several views of the drawings.

DETAILED DESCRIPTION

Figure 1:
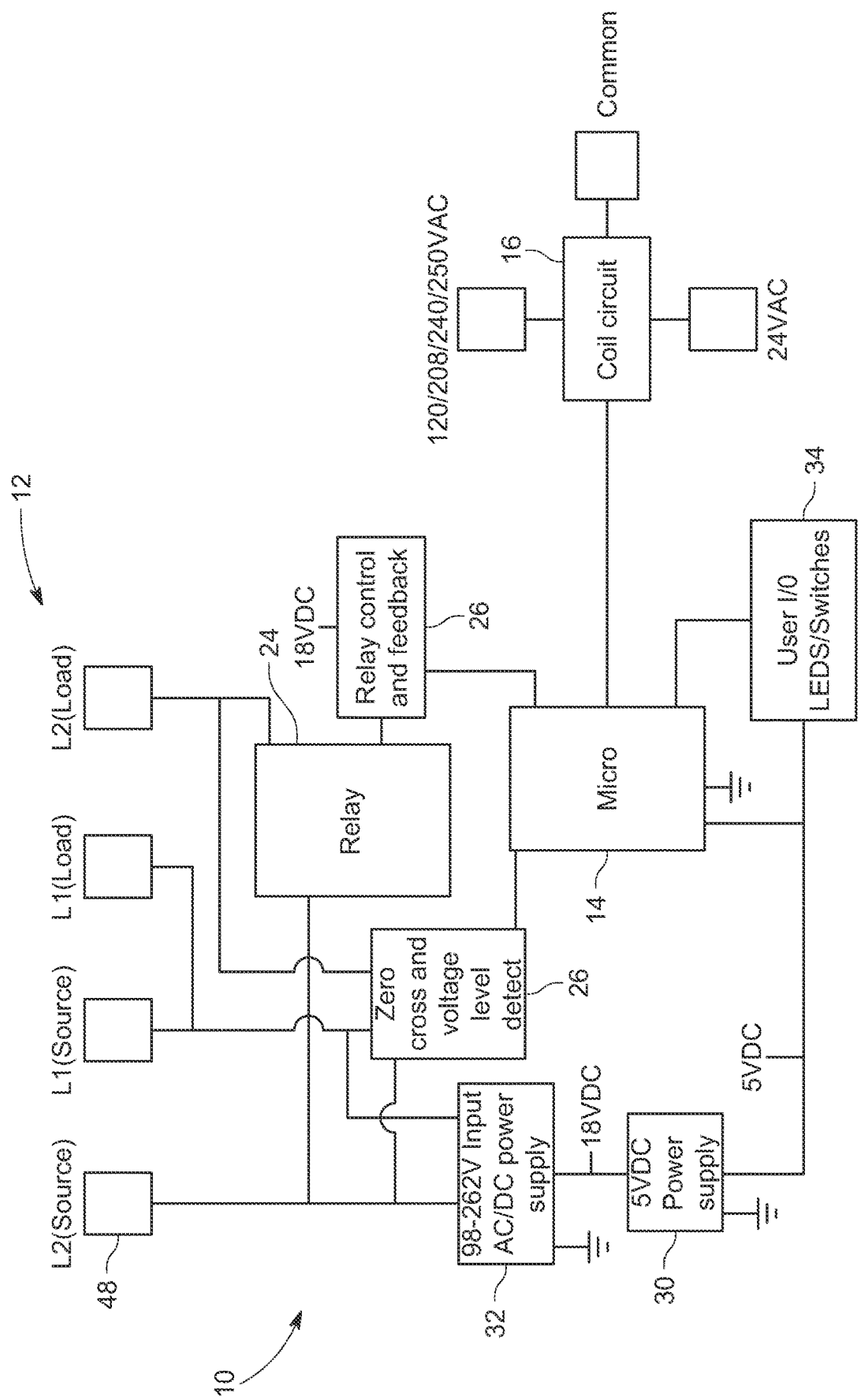
FIG. 1 is a schematic wiring diagram illustrating an y embodiment of a relay switch control connected with components of an HVAC system in accordance with an exemplary implementation of the present disclosure.

Example embodiments will now be described more fully with reference to the accompanying drawings.

Exemplary embodiments are disclosed that include multi-voltage contactors. The multi-voltage or universal contactors may be configured to be operable across or with a range of activation inputs, such as activation inputs ranging from 98 VAC to 276 VAC inputs (e.g., 120, 208, 240, 250, 24 VAC inputs, etc.), etc. For example, a multi-voltage contactor disclosed herein may be configured to accept a 120, 208, 240, 250, or 24 VAC activation input to switch loads of the same or different voltages. By way of comparison, an existing residential cooling specific design of a printed circuit board (PCB) mounted relay capable of high current compressor switching may be configured to only accept a 24 VAC input.

In exemplary embodiments, a relay switch control may include a circuit similar or identical to a circuit of a microprocessor-controlled replacement for a standard contactor as disclosed in U.S. Patent Application US2013/0211615, the entire disclosure of which is incorporated herein by reference. In exemplary embodiments disclosed herein, the relay switch control may be configured to include the following features:

The power supply may be configured to run on 98-276 VAC inputs.

The coil/control circuit may be configured to run on 1201208/240/250V input or 24V input, with ground or neutral reference.

A firmware algorithm may be provided to account for brownout.

A firmware algorithm may be provided to account for phase difference between the switched voltage and the coil voltage. This may include a routine that samples throughout the line cycle and looks for a balance of high and signals indicating an AC signal.

A common connector and two potential power connections may be provided for the "coil" connection. A sliding plastic door may help prevent miswiring such that only one of the power connections (120/208/240/250V or 24V) is available to connect at a time. The door may only enable connection to the low voltage AC power or the line voltage source.

A wiring box may be integrated into a plastic enclosure with the potential for an optional compressor switch.

A method of detecting AC voltage may also be included.

With the ability to accept a range of activation inputs (e.g., 98-276 VAC inputs, or 120, 208, 240, 250, or 24 VAC inputs, to switch loads of the same or different voltages, exemplary embodiments of the multi-voltage contactors disclosed herein may be used to replace multiple different voltage-specific contactors. For example, the multi-voltage contactors disclosed herein may be used as a multi-voltage electronic replacement for mechanical compressor contactors, which typically are voltage specific on the coil side.

Exemplary embodiments may also provide benefits of an enclosed PCB mounted relay with zero cross capability that can be used on multiple voltages and phases. Exemplary embodiments may also include an integrated wiring box that allows for reduced number of parts required by the original equipment manufacturer (OEM).

Figure 2:
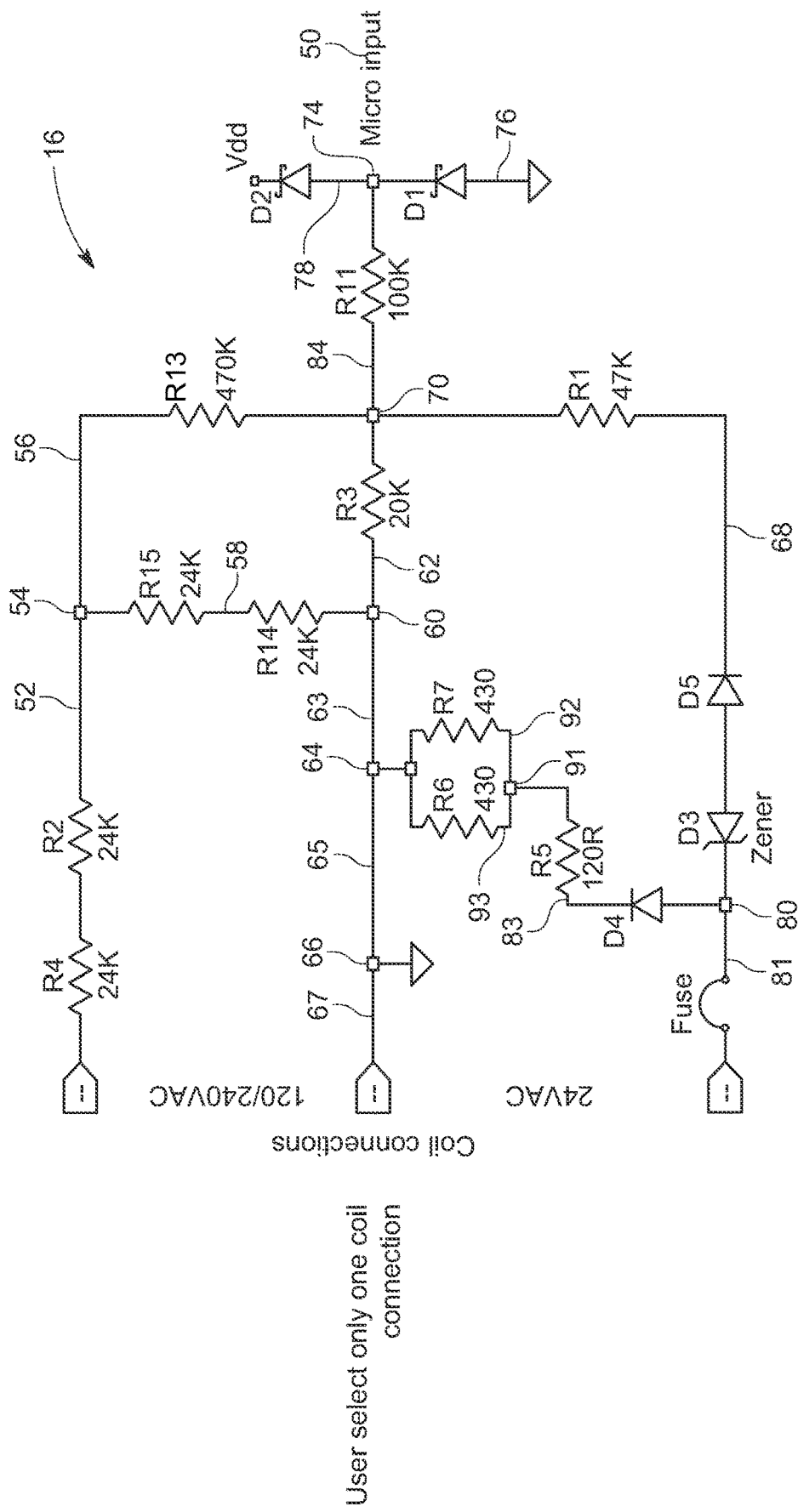
FIG. 2 is a schematic wiring diagram illustrating an exemplary embodiment of a "coil" control circuit in accordance with an exemplary implementation of the present disclosure.

FIG. 1 illustrates an exemplary embodiment of a relay switch control 10 embodying one or more aspects of the present disclosure. The relay switch control 10 is connected with components of an HVAC system indicated generally by reference number 12. The control 10 includes a microprocessor 14, which may include firmware changes for brown-out protection and/or for managing phase mismatch of a control circuit. The microprocessor 14 is configured to receive control signals (e.g., signals from an indoor thermostat (not shown), etc.) from a coil circuit 16. For example, the microprocessor 14 may be coupled for communication with and receive control signals via the micro input/out (IO) 50 of the coil control circuit 16 (FIG. 2).

The control 10 includes a relay 24 electrically connected with line voltage source L2 and load L2 (e.g., compressor motor, etc.). The relay 24 is also electrically connected with relay control and feedback 26. In turn, the relay control and feedback 26 is electrically connected with the microprocessor 14. The relay 24 is operable by the microprocessor 14 via the relay control and feedback 26 to electrically connect or disconnect the line voltage source L2 and load L2. The relay 24 may be substantially enclosed in a seal (e.g., a coating of epoxy glue, etc.) that is configured to prevent the intrusion of foreign objects (e.g., insects, debris, contaminants, etc.) into contacts (not shown) of the relay 24.

In the illustrated embodiment, the relay 24 is a latching relay. The control 10 may include zero cross and voltage level detect 26. With the aid, e.g., of optical sensing of sparking at the relay 24, the microprocessor 14 may be configured to provide "zero cross" switching of current through the relay 24 such that current is switched through the relay 24 at or very close to zero crossing of the line voltage. Such switching may be performed as disclosed in U.S. Pat. No. 7,464,561, the entire disclosure of which is incorporated herein by reference. Arcing and contact damage to the relay 24 may thereby be reduced or eliminated.

Also shown in FIG. 1 are a 5 VDC power supply 30, a 98-276V input AC/DC power supply 32, and user input/out devices 34. The user input/out devices 34 may include switches (e.g., dipswitches, push button switches, other switches, etc.) and LEDs (e.g., multi-colored LEDs, other light sources, etc.). For example, the control 10 may include two dipswitches disposed between two push buttons. Fewer or additional dipswitches and/or push buttons may be provided in other exemplary embodiments.

The PCB and housing of the relay switch control may be configured to accommodate for the potential line voltage connections, e.g., 24 VAC, 120/208/240/250 VAC, etc. In exemplary embodiments, the control 10 may be configured to be operable across or with a range of activation inputs, such as activation inputs ranging from 98 VAC to 276 VAC inputs (e.g., 120, 208, 240, 250, 24 VAC inputs, etc.) to switch loads of the same or different voltages.

A crankcase heater may also be connected to line voltages. The crankcase heater may be, e.g., a "belly band" crankcase heater. The control 10 may also be connected with a fan motor, a fan capacitor, and a compressor capacitor. R and C terminals of the control 10 may be connected, e.g., via lug type connectors 48, with R (run) and C (common) terminals of a compressor motor, etc. An S (start) terminal of the compressor motor may be connected with a HERM terminal of the compressor capacitor. The control 10 may be connected with a C (common) terminal of the fan motor. In this example, the control 10 may switch the fan motor on or off with the compressor motor through the relay 24. The fan motor may be, but is not limited to, e.g., a one-speed permanent split capacitor (PSC) motor for an outdoor fan, etc. R (run) and S (start) terminals of the fan motor may be connected with the fan capacitor. The example control 10 may be configured to be compatible with most, if not all, types of single-speed PSC outdoor fan motor wiring including 3-wire, 4-wire, and universal replacement motors.

The example control 10 may also be configured so that it is compatible with both dual capacitor (separate compressor and outdoor fan) systems and single capacitor (combined compressor and outdoor fan) systems. The example control 10 may be further configured to be compatible with both 2-wire and 3-wire hard start kits.

FIG. 2 illustrates an exemplary embodiment of a "coil" control circuit 16 embodying one or more aspects of the present disclosure. The "coil" control circuit 16 includes a micro input/output 50, which may be coupled with and transmit control signals to the microprocessor 14 of the relay switch control 10 (FIG. 1).

As shown in FIG. 2, the "coil" control circuit 16 includes terminals or coil connections labeled 120/240 VAC and 24 VAC. For a 24 VAC coil, the coil wires are connected to the 24 VAC terminal and a common terminal. For a line voltage coil, the coil wires are connected to the 120/240 VAC terminal and the common terminal. Accordingly, this illustrated exemplary embodiment is configured to accept the 120/240 VAC or 24 VAC activation input and switch loads of the same or different voltages. But as explained herein, exemplary embodiments may be configured to be operable across or with a range of activation inputs, such as activation inputs ranging from 98 VAC to 276 VAC inputs (e.g., 120, 208, 240, 250, 24 VAC inputs, etc.) to switch loads of the same or different voltages.

The "coil" control circuit 16 includes a fuse or protective device 17 in the current path of the 24 VAC control signal. The fuse or protective device may protect against miswiring.

The "coil" control circuit 16 further includes a plurality of diodes and a plurality of resistors. In this exemplary embodiment, the "coil" control circuit 16 includes five diodes D1, D2, D3, D4, and D5. By way of example only, diodes D1 and D2 may comprise Schottky diodes (e.g., 5 VDC Schottky diodes, etc.). Diode D3 may comprise a Zener diode the regulates current flow through net 68. Diodes D4 and D5 may comprise standard diodes to block current flow in one direction. The diodes D3 and D4 are electrically connected with the fuse via the junction 80 of the circuit paths 81, 83, and 68. Alternative embodiments may include more or less than five diodes and/or different diode configurations.

Also in this exemplary embodiment, the "coil" control circuit 16 include eleven resistors R1, R2, R3, R4, R5, R6, R7, R11, R13, R14, and R15. By way of example, resistor R1 may comprise a 47 k ohm resistor. Resistors R2, R4, and R15 may each comprise a 24 k ohm resistor. Resistor R13 may comprise a 470 k ohm resistor. Resistor R14 may comprise a 24 k ohm resistor. Resistors R6 and R7 may each comprise a 430 ohm resistor. Resistor R5 may comprise a 120 ohm resistor. Resistor R3 may comprise a 20K ohm resistor. Resistor R11 may comprise a 47 k ohm resistor. The resistance values for the eleven resistors are provided for purpose of illustration only. Alternative embodiments may include more or less than fifteen resistors and/or different resistor configurations.

With continued reference to FIG. 2, the 120/240 VAC terminal is electrically connected with resistors R4 along a circuit path 52. Resistor R4 is also electrically connected in series with resistor R2 along the circuit path 52.

Resistor R2 is electrically connected with resistor R15 and with the resistor R13 via a junction 54 of the circuit paths 52, 56, 58 that respectively include resistors R2, R13, and R15.

Resistor R15 is electrically connected in series with R14 along the circuit path 58. Resistor 14 is electrically connected with resistor R3 via junction 60 and circuit path 62 Resistor 14 is also electrically connected with the 120/240 VAC terminal via junctions 64, 66 and circuit paths 63, 65, 67.

The 120/240 VAC terminal is electrically connected with ground via the junction 66 and circuit path 67. The 120/240 VAC terminal is also electrically connected with the fuse electrically connected to the 24 VAC terminal via the junctions 66, 64, 91, 80, circuit paths 67, 65, 92, 93, 83, and 81, resistors R6, R7, R5, and diode D4 as shown in FIG. 2.

Resistor R13 is electrically connected with resistors R1, R3, and R11 via a junction 70 of the circuit paths 56, 62, 68, and 84 that respectively include resistors R13, R3, R1, and R11.

Resistor R11 is electrically connected with diode D1, diode D2, and the micro input/output 50 via a junction 74 of the circuit paths 84, 76, 78 that respectively include resistor R11, diode D1, and diode D2.

Diode D5 is electrically connected in series with diode D3 along the circuit path 68.

Diode D3 is electrically connected with diode D4 and with the fuse via the junction 80 of the circuit paths 68, 81, and 83 that respectively include diode D3, the fuse, and the diode D4.

Diode D4 is electrically connected in series with resistor R5 along circuit path 83. In turn, resistor R5 is electrically connected with resistor R6 and with resistor R7 via a junction 91 of the circuit paths 83, 92, and 93 that respectively include resistor R5, resistor R6, and resistor R7.

Figure 3:
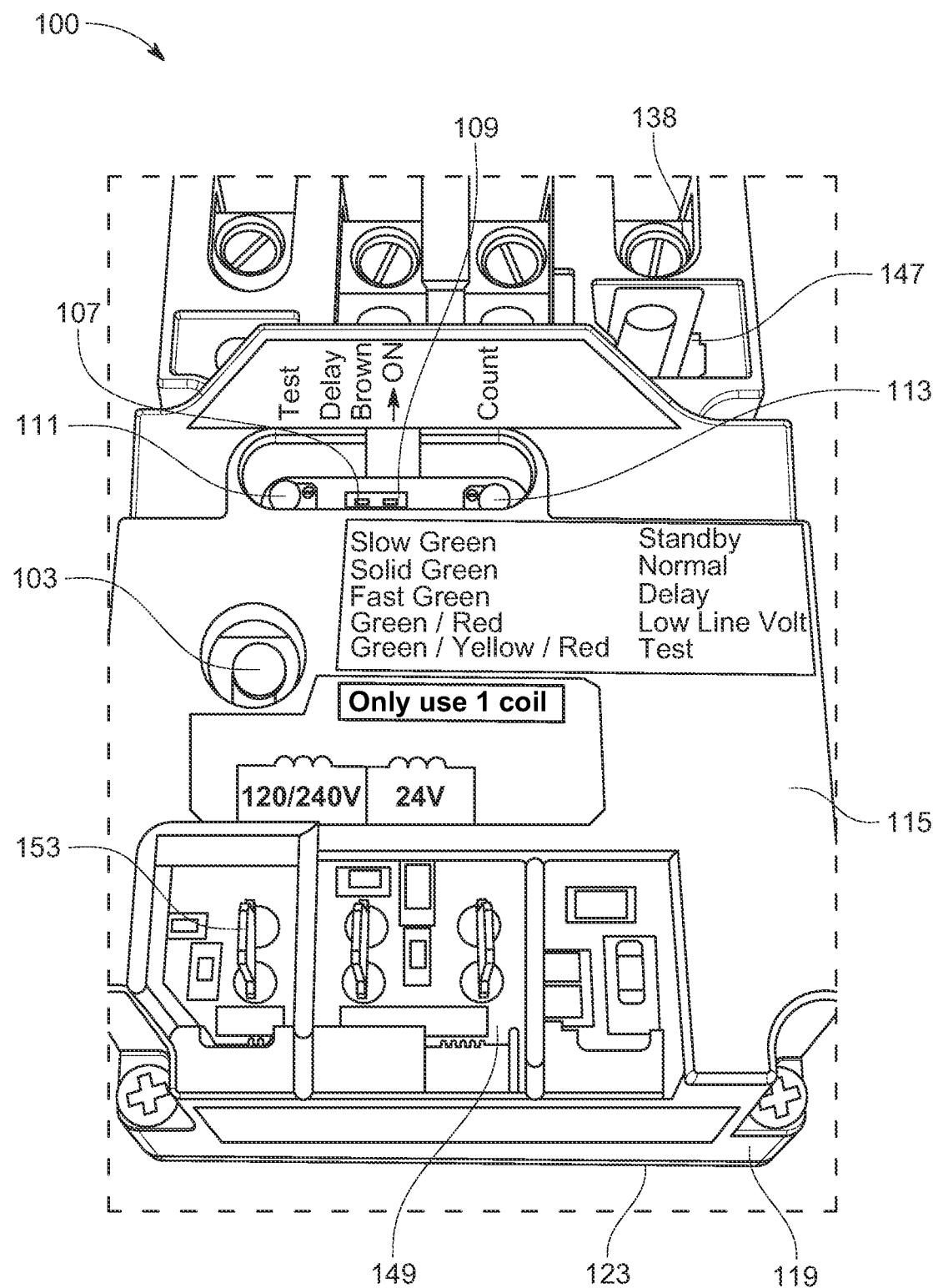
FIG. 3 shows an exemplary embodiment of a relay switch control, which may include the circuits shown in FIGS. 1 and 2 in accordance with an exemplary implementation of the present disclosure.

FIG. 3 shows an exemplary embodiment of a relay switch control 100 embodying one or more aspects of the present disclosure. The control 100 may include a microprocessor and sealed relay, e.g., circuits 10 and 16 as described with reference to FIGS. 1 and 2, respectively.

As shown in FIG. 3, the control 100 includes an indicator light 103 (e.g., a multi-color LED, other light source, etc.), which in the present example embodiment is a tri-color LED. The indicator light 103 is operable by a microprocessor (not shown) of the control 100 to indicate faults, status, and/or the number of cycles through which the relay has cycled.

In this exemplary embodiment, the control 100 includes two dipswitches 107 and 109. By way of example, the first dipswitch 107 may be used to select/set a short cycle delay, and the second dipswitch 109 may be used to select or deselect brownout protection. Also in this exemplary embodiment, the control 100 includes two push buttons 111 and 113 respectively indicated as "TEST" and "COUNT". An example operation and functionality of the onboard push buttons 111 and 113 ("TEST" and "COUNT") is described below.

The control 100 includes a two-piece housing 115, e.g., a two-piece plastic housing with integral mounting features, etc. The two-piece housing 115 includes an upper housing portion or cover 119 and a lower housing portion 123. A microprocessor and sealed relay are provided beneath the upper cover 119, and therefore are not visible in FIG. 3. The housing 115 may include openings in the upper housing portion or cover 119 for terminal connections and connections to a compressor and fan, etc. Lug connectors 138 are provided for line voltage inputs and outputs, e.g., as discussed above with reference to FIG. 1, etc. Connectors 147 are provided for connection of compressor and fan capacitors, fan, etc. to line voltages (L1, L2) e.g., as discussed above with reference to FIG. 1, etc.

The control 100 includes a printed circuit board (PCB) 149 on which the microprocessor and sealed relay are provided. Although the PCB 149 is horizontally situated relative to the housing bottom portion 123, a PCB could be oriented in other directions, e.g., vertically within the housing in other relay switch control embodiments, etc. Connectors 153 are provided on the PCB 149 for connection of the control 100, e.g., with a thermostat (not shown).

In various embodiments, other or additional components of a climate control system may be connected with the control 100, including but not limited to high pressure and low pressure switches, temperature sensors for suction and/or liquid lines from a compressor, etc. In some example embodiments, an ambient temperature sensor may be connected with the control 100 to enable a comparison between ambient temperature and a threshold temperature to determine whether to switch off a heat pump compressor.

The control 100 may include mounting holes (e.g., four-hole mounting, etc.) configured to match with existing standard contactor holes for mounting. The mounting holes may be oblong or elongated in both directions to provide added positioning flexibility. Components of the control 100 may be configured, e.g., assembled, to be snapped into the lower housing piece or portion 123, and then the top cover or upper housing portion 119 may be attached.

The relay switch control 100 may be provided, e.g., for use in relation to single stage air conditioning and heat pump condensing units with single-phase reciprocating or scroll compressors operating on standard residential and/or commercial (delta and/or wye) power configurations. The control 100 may be used as an aftermarket field upgrade device to replace a traditional contactor, while incorporating additional value-added features, such as short cycle protection, brownout protection, random start delay, cycle count retention and light indicator display. In various exemplary embodiments, a relay switch control is configured to operate using limited indoor unit input, e.g., from only two wires (Y1, C). Additionally, various embodiments may provide for control of a two-stage compressor and thus may include an additional input (Y2) terminal and means for switching a second stage on/off. An example relay switch control may have brownout protection, e.g., similar to that disclosed in U.S. Pat. No. 6,647,346, the entire disclosure of which is incorporated herein by reference.

Various relay switch control embodiments include a single relay for the fan and compressor. But in other exemplary embodiments, a relay switch control may include more than one relay, e.g., as disclosed in U.S. Pat. Nos. 7,100,382, 7,444,824, 7,464,561, and/or 7,694,525, the entire disclosures of which are incorporated herein by reference.

The relay switch control 100 may be used as a field replacement for a standard electromechanical contactor. A typical reason for the failure of standard open frame contactors is the intrusion into the contact area of insects, which foul the contacts and cause the contacts to fail. By using a sealed relay, the insect problem can be avoided and possibly eliminated.

The dipswitches 107 and 109 of the control 100 may be used to provide various features. For example, the first dipswitch 107 may be used to select/set a short cycle delay of, e.g., 0 or 180 seconds at 60 Hertz, 0 or 216 seconds at 50 Hertz, etc. The second dipswitch 109 may be used to select or deselect brownout protection. In various embodiments, a compressor lockout feature is provided through dipswitch(es). The lockout feature allows an installer to select how many failed attempts to start a compressor connected to the control 100 are to be allowed before the control 100 locks out the compressor. This feature can help protect a compressor and motor from damage, e.g., if a HVAC system needs service. In some embodiments, when a relay switch control locks out the compressor, a message is displayed (e.g., on a thermostat display, etc.) to call for servicing. In some embodiments, a setting for the dipswitch(es) is provided that prevents lock out of the compressor regardless of the number of failed starts.

In the exemplary embodiment of FIG. 3, the tri-color LED indicator 103 may be operable to indicate the number of cycles the relay has cycled, thereby indicating the number of cycles of a compressor and/or other motor connected thereto. Additionally or alternatively, the tri-color LED indicator 103 may be operable to indicate detected faults and/or status conditions. Detected faults may be stored in memory (e.g., within EEPROM of the control, etc.). In various embodiments, a relay switch control may be configured to retain the last stored fault for display if power is lost.

Figure 4:
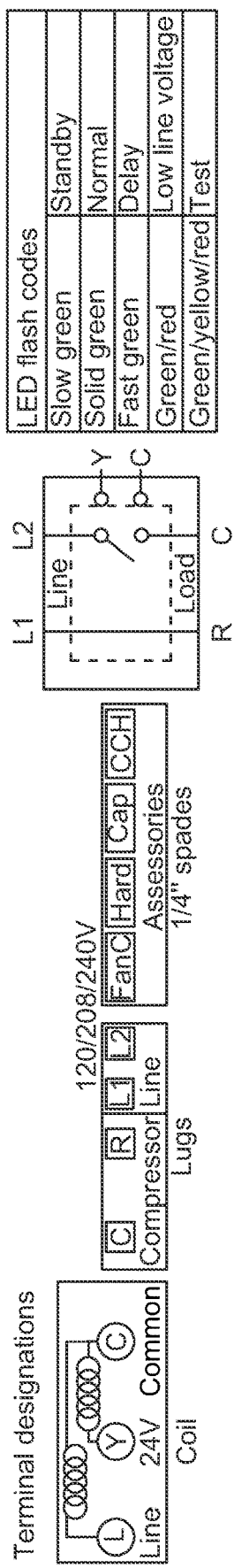
FIG. 4 illustrates exemplary terminal designations and LED flash codes that may be used with the relay switch control shown in FIG. 3 in accordance with an exemplary implementation of the present disclosure.

Referring again to the control 100, faults and status conditions may be indicated, e.g., by color(s) and/or "blink" rate(s) of the LED indicator 103. Operation of the LED indicator 103 depends on which push button 111 or 113 is depressed. The example control 100 has two push buttons 111, 113. The first push button 111 is indicated as "TEST", and the second push button 113 is indicated as "COUNT". The operation and function of the tri-color LED indicator 103 may be as shown in the Table shown in FIG. 4 in regard to LED flash codes that may be displayed through the tri-color LED 103. As shown in FIGS. 3 and 4, the LED flash codes may be slow green flashing for standby, solid green for normal, fast green flashing for delay, green/red flashing for low line voltage, and green/yellow/red flashing for test. Indications of other or additional faults and/or status conditions may be provided in various embodiments.

FIG. 4 also provides terminal designations that may be used for the control 100 (FIG. 3). For example, FIG. 4 shows that for coil details for voltage over 100 VAC, the line level control voltage is connected to "Line", and the neutral or opposite leg is connected to "Common". FIG. 8 also shows that for class 2 24 VAC, the 24V control voltage is connected to "Y", and the 24V ground is connected to "Common".

By way of example, the operation and functionality of the onboard push buttons 111 and 113 ("TEST" and "COUNT") shown in FIG. 3 may be as follows.

A. Pushing the "TEST" button 111 for more than one second provides a five-second powered check of a connected compressor and outdoor fan. Any active delays such as the short cycle timer are bypassed. Any pressure switch lockouts are also cleared by pressing the "TEST" button, and a brownout/low voltage threshold is ignored. The tri-color LED indicator 103 alternates flashing Green-Yellow-Red while the test is active, and then resumes normal displays.

B. Pushing both the "TEST" and "COUNT" buttons 111, 113 for more than two seconds activates a fault recall mode. The tri-color LED 103 displays the last fault for ten seconds, after which time the control 100 resumes normal displays. If the "TEST" and "COUNT" buttons 111, 113 are simultaneously pushed for between five and ten seconds, the last fault is cleared, and the control 100 then resumes normal displays.

C. Pushing the "COUNT" button 113 for more than one second activates a cycle count display mode. In some embodiments, a green LED (i.e., the LED 103 when producing green colored light) represents ten-thousands, a red LED represents thousands, and a yellow LED represents hundreds. Basic numerical rounding may be used to simplify displays. An example of a stored count of 52,518 compressor relay operations would blink out as 5 green, 2 red, 5 yellow. The cycle count is not resettable in the field in this exemplary embodiment. Other or additional push button designations, push button hold times, LED colors, LED blink rates and combinations of the foregoing could be used in various exemplary embodiments.

Referring again to the control 100 shown in FIG. 3, example timing periods may include anti-short-cycle-delay of 0 seconds or 180 seconds (selectable) at 60 Hertz, and 0 seconds or 216 seconds (selectable) at 50 Hertz. Compressor test may be 5 seconds at 60 Hertz and 6 seconds at 50 Hertz. In an exemplary embodiment, the control 100 may be configured to have the following specifications or electrical ratings:

Line voltage input . . . 120/208/240/250 VAC, 50/60 Hz
Full load amperes . . . (FLA) 40 A
Locked rotor amperes . . . (LRA) 200 A
Control (Coil) voltage (Y, C) . . . 24 VAC, 50/60 Hz
(Line C) . . . 120/208/240/250 VAC, 50/60 Hz In exemplary embodiments, a relay switch control may include a high-reliability, optically-controlled latching relay, sealed against the intrusion of insects and debris, and that is operable with or across a range of activation inputs, such as activation inputs ranging from 98 VAC to 276 VAC inputs (e.g., 120, 208, 240, 250, 24 VAC inputs, etc.), etc. Various embodiments may provide line voltage brownout protection by de-energizing a compressor, e.g., in the event of calls for compressor operation during line voltage drops. Various embodiments may provide short cycle protection, e.g., by activating a short delay before normal operation for compressors in air conditioners and heat pumps. Relay switch controllers or controls in exemplary embodiments may also detect inputs from high and low pressure switches and lock out compressor operation, e.g., when multiple consecutive pressure switch openings are detected. Additionally or alternatively, example embodiments of relay switch controls may include a cycle counter feature that a user may activate by push button, to determine and display how many times a compressor relay has turned on. Additionally or alternatively, example embodiments of relay switch controls may include a random start delay timer function, e.g., as further described below.

An example embodiment of a relay switch control disclosed herein may be configured for use as a field replacement suitable for replacing any of a plurality of different configurations (e.g., up to 5 ton/40 A, 1-pole, 1.5 pole, 2-pole configurations, etc.) of contactors. Example embodiments may be relatively easy to install, e.g., using lug connectors and a mounting plate that can be installed in the same location previously occupied by a conventional contactor. In various embodiments, relay switch controls may be self-powered and/or may be wired into existing wiring without requiring any new wires.

The control 100 may be self-powered and/or may be configured with a power stealing feature in exemplary embodiments. In various embodiments, the control 100 may include its own power supply such that an installer is not required to pull additional wires to the outdoor unit.

In addition to being operable across or with a range of activation inputs, such as activation inputs ranging from 98 VAC to 276 VAC inputs (e.g., 120, 208, 240, 250, 24 VAC inputs, etc. exemplary embodiments may also include or provide one or more of (but not necessarily any or all of) the following features, functions, and benefits. For example, reliability may be improved at least due to one or more of the following features in various embodiments.

(a) Control relay contacts are enclosed in a seal, thereby preventing insects, debris, and other contaminants from getting into the relay.
(b) Relay smart "zero cross" switching can inhibit contact damage and improve cycle life.
(c) Line voltage brownout protection is selectable to deactivate operation in excessively low voltage conditions, on start-up, and/or during run.
(d) Short cycle protection is selectable, e.g., to maintain equal system pressure conditions.
(e) The latching relay can reduce or eliminate chatter and can reduce VA draw (e.g., zero chatter latching relay, etc.).

Figure 6:
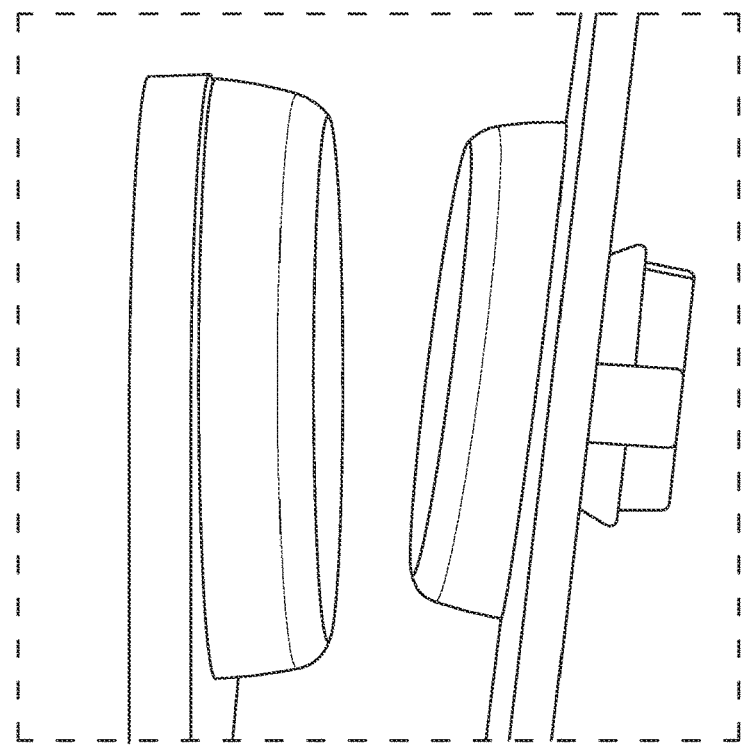
FIG. 6 shows an exemplary embodiment of a contactor after one million cycles using microprocessor controlled switching algorithms that reduce arcing and virtually eliminates contact pitting and welding.
Figure 7:
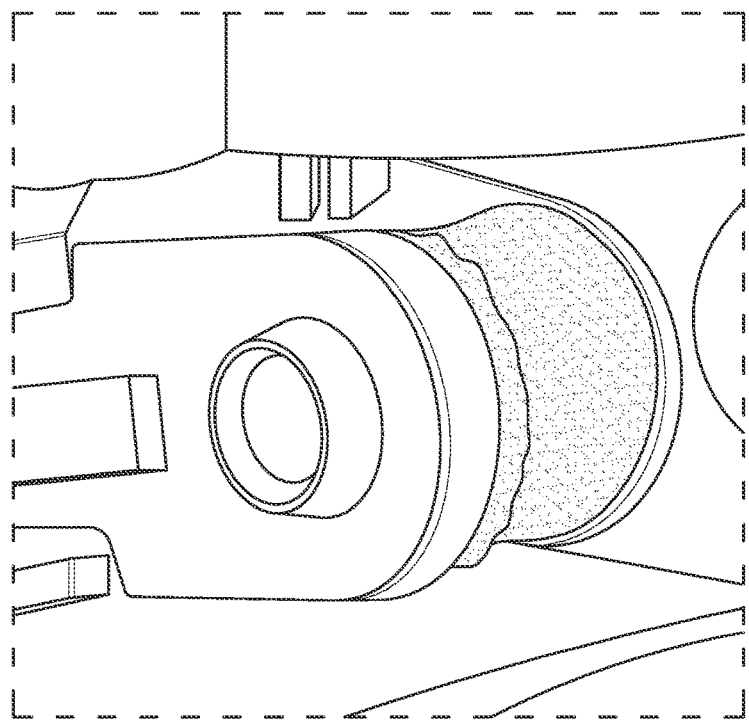
FIG. 7 shows a traditional contactor shown after 300,000 cycles, whereby a comparison of FIGS. 5 and 6 shows a performance improvement that may be realized by using microprocessor controlled switching algorithms in accordance with exemplary implementations of the present disclosure.

Exemplary embodiments may include a reliable one-million-cycle rated, sealed electronic switch with microprocessor control that inhibits arcing that may otherwise cause contact welding and pitting. For example, FIG. 6 shows an exemplary embodiment of a contactor after one million cycles using microprocessor controlled switching algorithms. By comparison, FIG. 7 shows a traditional contactor after only 300,000 cycles. A comparison of FIGS. 6 and 7 shows the performance improvement (e.g., 5× longer contactor life, over one million cycles, increased reliability, etc.) that may be realized by using microprocessor controlled switching algorithms in accordance with exemplary implementations of the present disclosure. In exemplary embodiments, the switch may be provided in a seal that prevents insects, ants, debris, etc. from entering the switch and saves on pest control treatment.

Exemplary embodiments may allow for one contactor part number to replace the following contactor applications, including (1) AC contactors that operate on 24 VAC that allow for proper operation of legacy thermostats (e.g., mechanical thermostats with anticipation, power stealing); (2) Refrigeration contactors that use 120V, 208V, 240V, or 250V AC coils; and (3) Non-Compressor applications (e.g., motors, fans, etc.) with coils of 24 VAC, 120 VAC, 208 VAC, 240 VAC, or 250 VAC.

Exemplary embodiments may include a door or other covering for the terminals to aid in hook up of a multi-voltage connection. Exemplary embodiments may include a fuse or protective device in the current path of the 24 VAC control signal. The fuse or protective device may protect against miswiring.

Exemplary embodiments may be configured with brownout auto detect implemented via a firmware algorithm (e.g., within the microprocessor 14 (FIG. 1), etc.) for determining input voltage and adjusting brownout threshold.

An example method 221 for determining input voltage and adjusting brownout threshold is disclosed in FIG. 5. As shown in FIG. 5, the method 221 includes, at 223, using complimented EEPROM (broadly, memory) location with 3 separate values to identify 3 conditions. At power up, the control will check EEPROM to determine a brownout threshold value. If the voltage level has not been set (production default value), this will cause the control to determine voltage level at 225. If the voltage level is 120 VAC, the brownout threshold will be set at 93 VAC for this 120 VAC voltage level. If the voltage level is 240 VAC, the brownout threshold will be set at 180 VAC for this 240 VAC voltage level.

At 225, the method 221 includes determination of voltage range. If the EEPROM locations from 223 show Voltage Level Not Set, the control will monitor input voltage. If the monitored input voltage is determined to be stable within a range from 90 VAC to 140 VAC, then the control will set the EEPROM to the 120 VAC voltage level. And, the brownout threshold will be set at 93 VAC for this 120 VAC voltage level. Otherwise, if the monitored input voltage is not determined to be stable within a range from 90 VAC to 140 VAC, then the control will set the EEPROM to the 240 VAC voltage level. And, the brownout threshold will be set at 180 VAC for this 240 VAC voltage level.

At 227, the method 221 includes brownout error. If the line voltage remains below the brownout threshold and the dipswitch brownout (e.g., SW2-2 or dipswitch 109 in FIG. 3, etc.) is set to the ON position, the control will display the appropriate error code (e.g., the LED flash code for brownout shown in FIG. 4, etc.). The control will de-energize relay and not allow the relay to resume until the voltage returns to a minimum of 190V for 240V level or 100V for 120V level. If the dipswitch brownout (e.g., SW2-2 or dipswitch 109 in FIG. 3, etc.) is set to the OFF position, the control will not act upon a low VAC line condition.

At 229, the method 221 includes voltage level reset. If the dipswitch brownout (e.g., SW2-2 or dipswitch 109 in FIG. 3, etc.) changes from the OFF state to the ON state, the control will set the voltage level.

Exemplary embodiments of the multi-voltage contactors and controls disclosed herein may be applied to or used with air conditioning systems and/or refrigeration systems. Exemplary embodiments disclosed herein may also be used with or applied to any other application using a contactor to switch an inductive load, such as the inductive loads of electric motors (e.g., pumps, compressors, conveyors, etc.). Although various exemplary embodiments are disclosed herein in relation to a compressor motor, the present disclosure is not so limited. Various embodiments are contemplated in relation to various types of loads, including but not limited to motors that may be switched through contactors/relays, etc. Embodiments of relay switch controls also are contemplated in relation to various types of systems, including but not limited to climate control systems, HVAC, refrigeration systems, pools, spas, hot tubs, water wells, compression based cooling systems, etc. Additionally, although the term "relay switch control" is used herein to refer to various exemplary embodiments, various types of controls, controllers, hardware, software, combinations thereof, etc. could also be used. Various types of processors, microprocessors, computers, etc. could also be utilized in accordance with various implementations of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (the disclosure of a first value and a second value for a given parameter can be interpreted as disclosing that any value between the first and second values could also be employed for the given parameter). Similarly, it is envisioned that disclosure of two or more ranges of values for a parameter (whether such ranges are nested, overlapping or distinct) subsume all possible combination of ranges for the value that might be claimed using endpoints of the disclosed ranges.

The terminology used herein is for the purpose of describing particular example embodiments only and is not intended to be limiting. For example, when permissive phrases, such as "may comprise", "may include", and the like, are used herein, at least one embodiment comprises or includes the feature(s). As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances. Whether or not modified by the term "about," the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A relay switch control configured for connection with one or more components and one or more line voltage sources, the relay switch control comprising:
    a processor;
    a relay operable by the processor to electrically connect or disconnect the one or more line voltage sources; and
    a control circuit configured to be coupled for communication with and/or to transmit control signals to the processor, the control circuit including a common terminal, a first terminal capable of receiving a voltage input of 24 VAC, and a second terminal capable of selectively receiving a voltage input within a range of voltage inputs including 120 VAC, 208 VAC, 240 VAC, or 250 VAC;
    wherein the processor is configured to be operable for determining input voltage and adjusting brownout threshold;
    wherein the relay switch control is configured to:
        at power up, determine a voltage level set within a memory;
        if the voltage level is set at 120 VAC within the memory, set the brownout threshold at 93 VAC;
        if voltage level is set at 240 VAC within the memory, set the brownout threshold at 180 VAC; and
        if voltage level is not set within the memory:
            monitor input voltage;
            determine if the monitored input voltage is stable within a range from 90 VAC to 140 VAC;

set the voltage level at 120 VAC within the memory and set the brownout threshold at 93 VAC if the monitored input voltage is determined to be stable within the range from 90 VAC to 140 VAC; and set the voltage level at 240 VAC within the memory and set the brownout threshold at 180 VAC if the monitored input voltage is not determined to be stable within the range from 90 VAC to 140 VAC.

2. The relay switch control of claim 1, wherein the relay switch control is configured to be selectively operable with:
   a 24 VAC coil when wires of the 24 VAC coil are connected to the first terminal and the common terminal; and
   a line voltage coil when wires of the line voltage coil are connected to the second terminal and the common terminal.

3. The relay switch control of claim 1, wherein the control circuit includes a fuse coupled with and/or in the first terminal that is configured to protect against miswiring.

4. The relay switch control of claim 1, further comprising an AC/DC power supply configured to be operable with inputs ranging from 98 VAC to 276 VAC inputs.

5. The relay switch control of claim 1, wherein the relay switch is a part of a contactor that is configured to be selectively interchangeable with:
   an AC contactor operable on 24 VAC;
   a refrigeration contactor having 120 VAC, 208 VAC, 240 VAC, or 250 VAC coils; and
   a non-compressor contactor having 24 VAC, 120 VAC, 208 VAC, 240 VAC, or 250 VAC coils.

6. The relay switch control of claim 1, wherein the relay switch is a part of a contactor, and the contactor comprises a cover or door movable relative to the first terminal and the second terminal, such that only one of the first terminal or the second terminal is available for connection at a given time.

7. The relay switch control of claim 1, wherein the relay switch is a part of a contactor, and the contactor comprises a cover or door movable relative to the first terminal and the second terminal between at least:
   a first position in which the first terminal is exposed and available for connection, and the cover or door is disposed over the second terminal and inhibits connection to the second terminal; and
   a second position in which the second terminal is exposed and available for connection, and the cover or door is disposed over the first terminal and inhibits connection to the first terminal.

8. The relay switch control of claim 1, wherein the relay switch is a part of a multi-voltage contactor that is configured to accept activation inputs ranging from 98 VAC to 276 VAC inputs and/or wherein the multi-voltage contactor is configured to accept 120, 208, 240, 250, and 24 VAC inputs and to switch loads of the same or different voltage.

9. The relay switch control of claim 1, wherein the relay switch control is configured for connection with one or more components of an HVAC system or other compression based cooling system.

* * * * *